United States Patent [19]

Kishi

[11] Patent Number: 4,960,352
[45] Date of Patent: Oct. 2, 1990

[54] CHAMFERING MACHINE

[75] Inventor: Katsunobu Kishi, Tokyo, Japan

[73] Assignee: Nitto Kohki Co., Ltd., Tokyo, Japan

[21] Appl. No.: 464,314

[22] Filed: Jan. 12, 1990

[30] Foreign Application Priority Data

Jan. 17, 1989 [JP] Japan .................. 1-3665[U]

[51] Int. Cl.$^5$ ................... B23C 1/20; B27C 5/10
[52] U.S. Cl. .................... 409/180; 144/117 B; 144/134 D; 407/30
[58] Field of Search ............. 409/175, 180, 181, 182, 409/138; 144/134 D, 117 B, 231, 134 R; 407/30, 31, 56, 58, 59, 62, 115

[56] References Cited

U.S. PATENT DOCUMENTS

| | | | |
|---|---|---|---|
| 2,334,342 | 11/1943 | Manteros | 144/231 |
| 3,196,749 | 7/1965 | Zanni | 409/180 |
| 3,289,716 | 12/1966 | Dutot | 144/134 D X |
| 3,289,717 | 12/1966 | Dutot | 407/56 X |
| 3,360,023 | 12/1967 | Rutzebeck | 144/134 R |
| 3,733,663 | 5/1973 | Brucker | 144/134 D X |
| 4,187,046 | 2/1980 | Atherton | 409/180 |
| 4,417,835 | 11/1983 | Lund | 409/180 |
| 4,601,619 | 7/1986 | Stinnett | 409/178 X |
| 4,669,923 | 6/1987 | McKinney | 407/34 |
| 4,787,786 | 11/1988 | Freud et al. | 409/180 |

FOREIGN PATENT DOCUMENTS

| | | | |
|---|---|---|---|
| 956807 | 1/1957 | Fed. Rep. of Germany | 144/134 D |
| 1403736 | 11/1968 | Fed. Rep. of Germany | 144/117 B |

*Primary Examiner*—William Briggs
*Attorney, Agent, or Firm*—Nixon & Vanderhye

[57] ABSTRACT

A chamfering machine comprising a planar guide base, a rotary shaft extending at right angles to the guide base, upward and downward cutting edges attached to the rotary shaft and used to chamfer respective bottom and top edges of a workpiece, a first rotation guide located above the upward cutting edge so as to be in contact with a lateral face of the workpiece, a second rotation guide located below the downward cutting edge so as to be in contact with the lateral face of the workpiece, and an adjusting mechanism for retaining the cutting edges and the guide base for relative movement in the axial direction of the rotary shaft and adjusting the relative positions of the cutting edges and the guide base.

4 Claims, 2 Drawing Sheets

CHAMFERING MACHINE

BACKGROUND OF THE INVENTION

1. Field of the Invention

The present invention relates to a portable chamfering machine capable of chamfering the bottom side of a workpiece with improved efficiency.

2. Description of the Related Art

Conventionally, there exist portable chamfering machines, which are used to C-chamfer an edge portion of a workpiece by means of a rotating edged tool having a cutting edge on its outer periphery. In one such conventional chamfering machine, a body having the rotating edged tool on the distal end portion thereof is provided with a guide which has a rectangular guide surface adapted to be held against a corner portion of the workpiece, the cutting edge of the rotating edged tool being diagonally exposed through an included-angle portion of the guide surface. When using the chamfering machine with this construction for C-chamfering, the rectangular guide surface of the guide is held against the workpiece, and the machine is moved in this state.

However, when chamfering the bottom side of a workpiece by means of the conventional chamfering machine, it is necessary either to invert the workpiece or support the machine upside down so that the rectangular guide surface is held against the bottom edge portion. If each workpiece has to be inverted for bottom-side chamfering, the operating efficiency is low. In chamfering a bulky or heavy workpiece, moreover, the chamfering machine must be inverted during the work, so that the operator is forced to adopt an unnatural posture. Thus, the operating efficiency is extremely low.

SUMMARY OF THE INVENTION

The object of the present invention is to provide a portable chamfering machine capable of efficiently chamfering both top and bottom sides of a workpiece.

The above object of the present invention is achieved by a chamfering machine constructed as follows:

The chamfering machine of the present invention comprises a planar guide base, a rotary shaft extending at right angles to the guide base, upward and downward cutting edges attached to the rotary shaft and used to chamfer respective bottom and top edges of a workpiece, a first rotation guide located above the upward cutting edge so as to be in contact with a lateral face of the workpiece, a second rotation guide located below the downward cutting edge so as to be in contact with the lateral face of the workpiece, and adjusting means for retaining the cutting edges and the guide base for relative movement in the axial direction of the rotary shaft and adjusting the relative positions of the cutting edges and the guide base.

Using the chamfering machine according to the present invention, a top-side edge portion of the workpiece is chamfered in the following manner:

A distance necessary to achieve a desired depth of chamfering is maintained between the downward cutting edge and the guide base, so that this cutting edge abuts against the top-side edge portion of the workpiece. In this state, the rotary shaft is rotated, while the chamfering machine itself is moved so that the second rotation guide is in contact with the lateral face of the workpiece. In this manner, the top-side edge portion is chamfered.

To chamfer a bottom-side edge portion of the workpiece, it is necessary only to cause the upward cutting edge to abut against the bottom-side edge portion, without turning either the workpiece or the chamfering machine upside down. Then, the rotary shaft is rotated, while the chamfering machine itself is moved so that the first rotation guide is in contact with the lateral face of the workpiece. In this manner, the bottom-side edge portion is chamfered.

Thus, when chamfering the bottom side of the workpiece by means of the chamfering machine according to the present invention, it is necessary only that the machine be manually supported so that the planar guide base is set on the upper surface of the workpiece. In contrast with the conventional case, therefore, the workpiece need not be inverted for bottom-side chamfering, nor does the operator have to adopt an unnatural posture as would be necessary had the chamfering machine to be supported upside down as the guide base was held against the bottom face to effect chamfering of a large-sized workpiece. Thus, using the present invention, both top and bottom sides of the workpiece can be chamfered safely and efficiently.

BRIEF DESCRIPTION OF THE DRAWINGS

FIGS. 1 and 2 show a chamfering machine according to one embodiment of the present invention, of which FIG. 1 is a front sectional view of the machine ready to chamfer a top-side edge portion of a workpiece, and FIG. 2 is a partial front sectional view of the machine ready to chamfer a bottom-side edge portion of the workpiece.

DETAILED DESCRIPTION OF THE PREFERRED EMBODIMENTS

Figure 1:
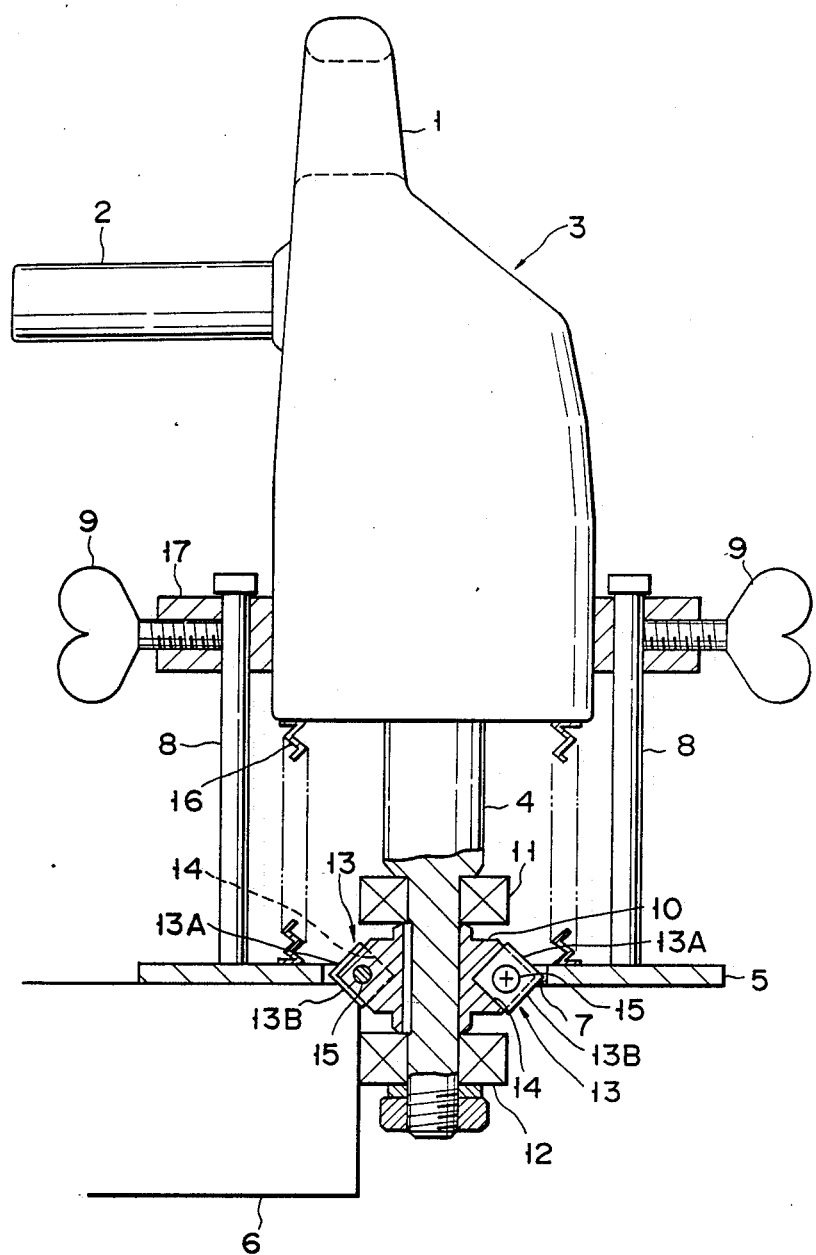

As shown in FIG. 1, a chamfering machine according to one embodiment of the present invention comprises grip portion 1 at the upper end portion and casing 3 with auxiliary handle 2 at the lateral portion. Casing 3 contains a motor (not shown) which is driven electrically or by fluid pressure. The rotatory force of the motor is transmitted to rotary shaft 4, which protrudes from casing 3, directly or through a speed reducer (not shown).

Numeral 5 denotes a planar guide base which is set on the surface of workpiece 6. Guide base 5 extends at right angles to rotary shaft 4. Four lift guides 8 are set up on base 5 so that they are arranged at angular intervals of, e.g., 90° around through hole 7 which is bored through base 5. Casing 3 can be raised or lowered with respect to guide base 5 by sliding ring-shaped holder 17, fixed to the outer peripheral portion of casing 3, along lift guides 8. Those portions of holder 17 which are situated near the insertion portions of one pair of lift guides 8, which are diametrically opposed to each other, are thick-walled, and a pair of thumb-screws 9 for fixing guides 8 are screwed individually in the thick-walled portions. Thus, the height of casing 3 above guide base 5 can be adjusted and fixed. Bellows-shaped cover 16 is disposed between the upper surface of guide base 5 and the lower end face of casing 3 so as to surround rotary shaft 4.

Cutter holder 10 is fixed to rotating shaft 4 which projects from casing 3. Also, first and second guide bearings 11 and 12, for use as first and second rotation guides, respectively, are fixed to shaft 4. Bearings 11 and 12 are located above and below holder 10, respectively, so that they can be in contact with a lateral face of workpiece 6. Numeral 13 denotes square cutter tips which each have a cutting edge on each of their four sides. Cutter holder 10 has a pair of fitting grooves 14 arranged diametrically opposite to each other. Each two adjacent cutting edges of each tip 13 can be exposed at an angle of 45° to guide base 5 through their corresponding fitting groove 14. Each tip 13 is fixed to its corresponding groove 14 by means of screw 15. In this state, cutting edge 13A is a diagonally upward edge used to chamfer the bottom side of workpiece 6, while cutting edge 13B is a diagonally downward edge used to chamfer the top side of the workpiece.

The following is a description of the operation of the aforementioned embodiment.

First, in chamfering a top-side edge portion of workpiece 6, thumbscrews 9 are loosened, and casing 3 is raised so that downward cutting edge 13B is exposed, from the bottom surface of guide base 5 through hole 7, to the extent necessary for a given depth of chamfering. After the required chamfering depth is set in this manner, screws 9 are tightened to fix the height of casing 3 above base 5. In this state, rotary shaft 4 is rotated to set guide base 5 on workpiece 6, in a manner such that the chamfering machine is supported by the operator's hands on grip portion 1 and auxiliary handle 2. As the chamfering machine itself is moved so that second guide bearing 12 is in contact with the lateral face of workpiece 6, downward cutting edge 13B, rotating together with shaft 4, chamfers the top-side edge portion of the workpiece.

Figure 2:
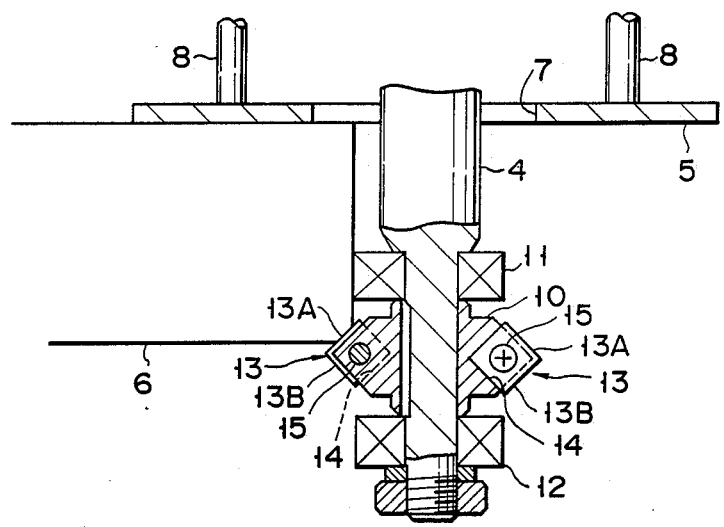

Then, in chamfering a bottom-side edge portion of workpiece 6, casing 3 is lowered to a position where upward cutting edge 13A abuts against the bottom-side edge portion, to set the depth of chamfering, in consideration of the thickness of the workpiece, as shown in FIG. 2. In doing this, neither workpiece 6 nor the chamfering machine itself need be turned upside down. After the required depth of chamfering is set in this manner, rotary shaft 4 is rotated to set guide base 5 on workpiece 6, in the same manner as aforesaid. As the chamfering machine itself is moved so that first guide bearing 11 is in contact with the lateral face of workpiece 6, upward cutting edge 13A, rotating together with shaft 4, chamfers the bottom-side edge portion of the workpiece. Thus, also in chamfering the bottom-side edge of workpiece 6, the operator has to support only the chamfering machine with his or her hands on grip portion 1 and auxiliary handle 2 so as to set guide base 5 on the top face of the workpiece. In contrast with the conventional case, therefore, the operator does not have to adopt an unnatural posture necessary were the chamfering machine being supported upside down as the guide base was being held against the bottom face to effect chamfering. Further, workpiece 6 need not be inverted on each occasion. Thus, the bottom-side edge portion of workpiece 6, as well as the top-side edge portion thereof, can be chamfered safely and efficiently.

In the chamfering machine of the present embodiment, moreover, first and second guide bearings 11 and 12 trace the configuration of the inner surface of the hole or the curved lateral face. Thus, the machine can be also used for chamfering the inner surface of the hole or the edge portion of the curved lateral face.

Figure 3:
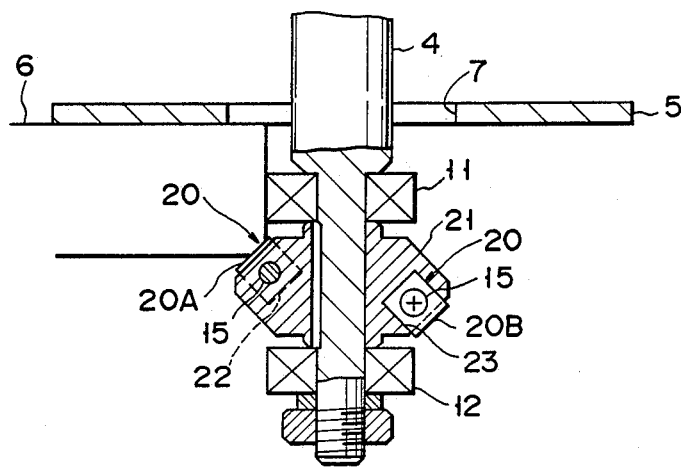
FIG. 3 is a partial front sectional view of a chamfering machine according to another embodiment of the invention, showing an arrangement in which a cutter tip having a cutting edge only on one side thereof is mounted.

FIG. 3 shows another embodiment of the arrangement for mounting cutter tips. In the arrangement shown in FIG. 3, cutter tip 20 having a cutting edge only on one side thereof can be used. Cutter holder 21 has three fitting grooves 22 arranged at angular intervals of 120°. A cutting edge of tip 20 can be upwardly exposed at an angle of 45° to guide base 5 through each fitting groove 22. Holder 21 also has three fitting grooves 23 arranged at angular intervals of 120° deviated at 60° from the intervals between grooves 22. The cutting edge of tip 20 can be downwardly exposed at an angle of 45° to guide base 5 through each fitting groove 23. Cutter tip 20 is fixed to each of fitting grooves 22 and 23 by means of screw 15. In this state, the cutting edge of tip 20 which is fixed to one of fitting grooves 22 serves a upward edge 20A used to chamfer the bottom side of workpiece 6, while the cutting edge of tip 20 which is fixed to one of fitting grooves 23 serves as downward edge 20B used to chamfer the top side of the workpiece. Tip 13 of the first embodiment can be also used in this arrangement.

It is to be understood that the present invention is not limited to the embodiments described above, and that various changes and modifications may be effected therein by one skilled in the art without departing from the scope or spirit of the invention.

In the aforementioned embodiments, for example, casing 3 itself is raised or lowered along lift guides 8. Alternatively, however, guide base 5 may be fixed to casing 3, provided rotary shaft 4 can be raised or lowered with respect to casing 3. Moreover, the upward and downward cutting edges for chamfering may be formed using bulk cutters, as well as cutter tips. Furthermore, the guide bearings may be replaced with fixed rings or ring-shaped guides integrally formed on the rotating shaft.

What is claimed is:

1. A chamfering machine comprising:
   a planar guide base;
   a rotary shaft extending at right angles to the guide base;
   upward and downward cutting edges attached to the rotary shaft and used to chamfer respective bottom and top edges of a workpiece;
   a first rotation guide located above the upward cutting edge so as to be in contact with a lateral face of the workpiece;
   a second rotation guide located below the downward cutting edge so as to be in contact with the lateral face of the workpiece; and
   adjusting means for retaining the cutting edges and the guide base for relative movement in the axial direction of the rotary shaft and adjusting the relative positions of the cutting edges and the guide base.

2. The chamfering machine according to claim 1, further comprising a casing retaining the rotary shaft, and wherein said adjusting means includes a lift guide fixed to the guide base, a ring-shaped holder attached to the casing and slidable along the lift guide, and a thumbscrew screwed into the ring-shaped holder and used to fix the holder to the lift guide.

3. The chamfering machine according to claim 1, further comprising a cover disposed between the casing and the guide base so as to surround the rotary shaft.

4. The chamfering machine according to claim 1, wherein said upward and downward cutting edges include a cutter holder disposed between the first and second rotation guides and a cutter tip attached to the cutter holder.

* * * * *